(12) United States Patent
Wang

(10) Patent No.: US 11,664,914 B2
(45) Date of Patent: May 30, 2023

(54) CLOCK SYNCHRONIZATION METHOD, SYSTEM AND DEVICE, AND STORAGE MEDIUM

(71) Applicant: SANECHIPS TECHNOLOGY CO., LTD., Shenzhen (CN)

(72) Inventor: Pengchao Wang, Shenzhen (CN)

( * ) Notice: Subject to any disclaimer, the term of this patent is extended or adjusted under 35 U.S.C. 154(b) by 0 days.

(21) Appl. No.: 17/297,284

(22) PCT Filed: Dec. 4, 2019

(86) PCT No.: PCT/CN2019/123082
§ 371 (c)(1),
(2) Date: May 26, 2021

(87) PCT Pub. No.: WO2020/114436
PCT Pub. Date: Jun. 11, 2020

(65) Prior Publication Data
US 2022/0029723 A1 Jan. 27, 2022

(30) Foreign Application Priority Data
Dec. 4, 2018 (CN) .......................... 201811473376.9

(51) Int. Cl.
*H04J 3/06* (2006.01)
(52) U.S. Cl.
CPC .................. *H04J 3/0667* (2013.01)
(58) Field of Classification Search
None
See application file for complete search history.

(56) References Cited

U.S. PATENT DOCUMENTS

| 8,644,351 B2 * | 2/2014 | Hamasaki | H04J 3/0688 |
| | | | 370/252 |
| 9,407,388 B2 * | 8/2016 | Grenabo | H04J 3/0667 |
| 9,438,364 B2 * | 9/2016 | Bui | H04J 3/0658 |

(Continued)

FOREIGN PATENT DOCUMENTS

| CN | 102064901 A | 5/2011 |
| CN | 102104476 A | 6/2011 |

(Continued)

OTHER PUBLICATIONS

International Search Report for corresponding application PCT/CN2019/123082 filed Dec. 4, 2019 : dated Feb. 26, 2020.

(Continued)

*Primary Examiner* — Alpus Hsu
(74) *Attorney, Agent, or Firm* — Cantor Colburn LLP

(57) ABSTRACT

Provided are a clock synchronization method, system and device, and a storage medium. The method includes that: in a case where a Precision Time Protocol (PTP) message is received, attribute information of a PTP port is determined according to the PTP port of the received PTP message, wherein the attribute information includes at least one of the following: clock node configuration type, high-precision mode or non-high-precision mode, non-high-precision ingress correction field (cf) modification mark or non-high-precision egress cf modification mark, and asymmetric compensation value; and clock synchronization is performed on the PTP message according to the attribute information of the PTP port.

18 Claims, 6 Drawing Sheets

(56) References Cited

U.S. PATENT DOCUMENTS

| | | | |
|---|---|---|---|
| 9,450,846 B1 | 9/2016 | Huang | |
| 9,577,774 B2 * | 2/2017 | Zhang | H04J 3/0641 |
| 9,690,674 B2 * | 6/2017 | Cui | H04L 69/28 |
| 10,158,444 B1 * | 12/2018 | Darras | H03K 3/01 |
| 10,171,227 B2 * | 1/2019 | Yin | H04L 7/0008 |
| 2007/0076783 A1 | 4/2007 | Dishman | |
| 2013/0227008 A1 * | 8/2013 | Yang | H04J 3/0667 |
| | | | 709/204 |
| 2013/0336117 A1 * | 12/2013 | Yan | H04J 3/0667 |
| | | | 370/235 |
| 2015/0148039 A1 | 5/2015 | Yang | |
| 2015/0318941 A1 | 11/2015 | Zheng | |
| 2016/0112185 A1 | 4/2016 | Yin | |
| 2017/0272191 A1 | 9/2017 | Zhang | |
| 2020/0413360 A1 * | 12/2020 | Ruffini | H04W 72/082 |

FOREIGN PATENT DOCUMENTS

| | | |
|---|---|---|
| CN | 102420688 A | 4/2012 |
| CN | 102447553 A | 5/2012 |
| CN | 106301996 A | 1/2017 |
| CN | 106357362 A | 1/2017 |
| EP | 2854325 B1 | 4/2014 |
| WO | 2013163803 A1 | 11/2013 |

OTHER PUBLICATIONS

European Search Report for corresponding application EP19894003; Report dated Dec. 21, 2021.

\* cited by examiner

CLOCK SYNCHRONIZATION METHOD, SYSTEM AND DEVICE, AND STORAGE MEDIUM

CROSS-REFERENCE TO RELATED APPLICATION

The present disclosure is a National Stage Filing of the PCT International Application No. PCT/CN2019/123082 filed on Dec. 4, 2019, which claims priority to Chinese Patent Application No. 201811473376.9, filed to the China National Intellectual Property Administration on Dec. 4, 2018, the disclosure of which is hereby incorporated by reference in its entirety.

TECHNICAL FIELD

Embodiments of the present disclosure relate to a Precision Time Protocol (PTP), for example, to a clock synchronization method, system and device, and a storage medium.

BACKGROUND

In a communication network, the normal operation of many services requires network clock synchronization, that is, the time or frequency difference among multiple devices throughout the network is maintained at a reasonable error level.

The PTP is a clock synchronization protocol. The PTP is designed for high-precision synchronization between devices, but can also be used for frequency synchronization between devices. Compared to multiple time synchronization mechanisms, the PTP has the following advantages: (1) compared to a Network Time Protocol (NTP), the PTP can meet the requirement of higher precision time synchronization; generally, the NTP can only reach sub-second time synchronization precision, while the PTP can reach sub-microsecond time synchronization precision; and (2) compared to Global Positioning System (GPS), the PTP has lower construction and maintenance costs, and has special significance in terms of national security because of the ability to wean itself off GPS.

A network in which the PTP protocol is applied is called a PTP domain. A node in the PTP domain is called a clock node. The PTP protocol defines three types of basic clock nodes: Ordinary Clock (OC), Boundary Clock (BC) and Transparent Clock (TC). Different types of clock nodes adopt different clock synchronization technologies and achieve different clock synchronization precisions. The PTP clock synchronization technology mainly includes two methods, that is, high-precision clock synchronization and non-high-precision clock synchronization.

In actual complex application scenarios, there are some mixed clock nodes, such as TC+OC/BC which combines the characteristics of TC and OC/BC, and there are also scenarios in which the non-high-precision clock synchronization and the high-precision clock synchronization are intertwined. However, in the related art, there is no technical solution for clock synchronization, which can support all of the OC/BC/TC modes and is compatible for both the processing of the high-precision clock synchronization and the processing of the non-high-precision clock synchronization.

SUMMARY

The embodiments of the present disclosure provide a clock synchronization method, which may include the following operations.

In a case where a PTP message is received, attribute information of a PTP port is determined according to the PTP port of the received PTP message, wherein the attribute information includes at least one of the following: clock node configuration type, high-precision mode or non-high-precision mode, non-high-precision ingress correction field (cf) modification mark or non-high-precision egress cf modification mark, and asymmetric compensation value.

Clock synchronization is performed on the PTP message according to the attribute information of the PTP port.

The embodiments of the present disclosure also provide a clock synchronization system, which may include a determining unit and a clock synchronization unit.

The determining unit is configured to determine, in a case where a PTP message is received, attribute information of a PTP port according to the PTP port of the received PTP message, wherein the attribute information includes at least one of the following: the clock node configuration type, the high-precision mode or non-high-precision mode, the non-high-precision ingress cf modification mark or non-high-precision egress cf modification mark, and the asymmetric compensation value.

The clock synchronization unit is configured to perform clock synchronization on the PTP message according to the attribute information of the PTP port.

The embodiments of the present disclosure also provide a clock synchronization device, which may include a memory, a processor and a computer program which is stored on the memory and capable of running on the processor. When executed by the processor, the computer program implements the clock synchronization method.

The embodiments of the present disclosure also provide a computer-readable storage medium, which stores an information processing program. When executed by the processor, the information processing program implements the clock synchronization method.

DETAILED DESCRIPTION OF THE EMBODIMENTS

Figure 1:
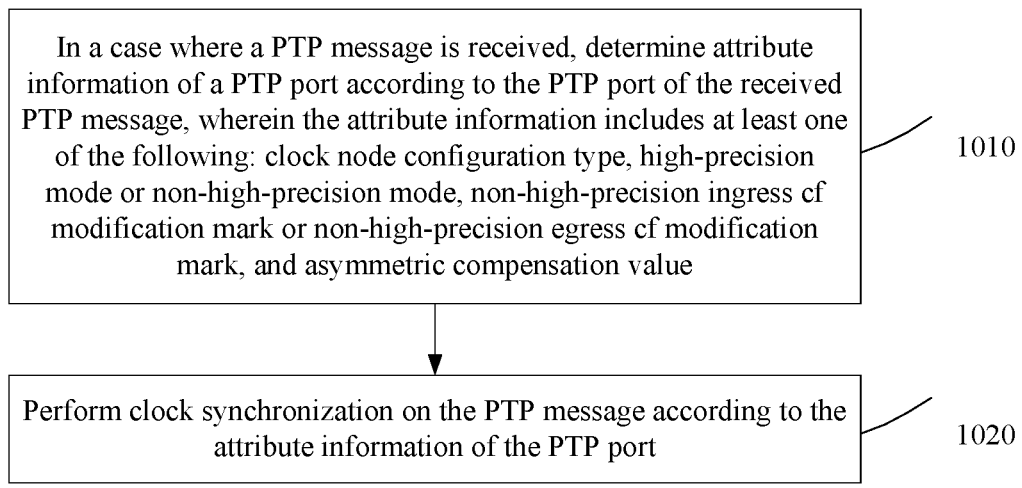
FIG. 1 is a flowchart of a clock synchronization method.

The embodiments of the present disclosure are described below in combination with the accompanying drawings. These operations shown in the flowchart of the accompanying drawings can be executed in a computer system such as a group of computer executable instructions. Moreover, although a logical sequence is shown in the flowchart, in some cases, the shown or described operations can be performed in a sequence different from that described herein.

A node in a PTP domain is called clock node. The PTP protocol defines the following three types of basic clock nodes.

(1) OC: this clock node can only have one PTP port in the same PTP domain to participate in clock synchronization and synchronize time from an upstream clock node through the port. In addition, when acting as a clock source, the clock node may issue the time to a downstream clock node through only one PTP port.

(2) BC: this clock node has multiple PTP ports in the same PTP domain to participate in time synchronization. This clock node synchronizes the time from the upstream clock node through one of the multiple PTP ports, and issues the time to the downstream clock node through the rest of the ports.

(3) TC: compared to the OC/BC, the OC/BC needs to keep time synchronization with other clock nodes, while the TC does not. The TC has multiple PTP ports, but only forwards a PTP message among these ports and performs forward delay correction for the PTP message, without synchronizing the time through any port.

Except the above three basic clock nodes, there are some mixed clock nodes, such as TC+OC/BC which combines the characteristics of the TC and the OC/BC. The TC+OC/BC has multiple PTP ports in the same PTP domain, one of which is of type OC/BC and the others are of type TC. On the one hand, the TC+OC/BC forwards the PTP message through a port of type TC and performs forward delay correction on the PTP message; on the other hand, the TC+OC/BC performs clock synchronization through a port of type OC/BC.

The implementation of clock synchronization technology mainly adopts the following two methods.

(1) A time stamp unit processes the sending and receiving time of a 1588 message, and a switching chip only implements the calculation of residence time and modifies a cf field in the message. Due to a certain delay between the time stamp unit and the sending of the PTP message from the switching chip, the implementation of the method results in low precision of clock synchronization, which is hereinafter referred to as a non-high-precision mode.

(2) A time stamp unit sends a 1588 message, a Physical Coding Sublayer (PCS) of a switching chip processes the sending and receiving time of the 1588 message, and modifies only a sending time field of the message. The method has high clock synchronization precision, but can only support an OC/BC mode, not a TC mode, which is hereinafter referred to as a high precision mode.

Because in actual complex application scenarios, there are scenarios in which the non-high-precision clock synchronization and the high-precision clock synchronization are intertwined, that is, one switching chip may simultaneously act as an OC/BC/TC clock. Due to the difference between two processing modes, it is needed to support flexible switch between the high precision clock synchronization and the non-high-precision clock synchronization in the same switching chip, so as to adapt to the complex application scenarios.

Therefore, the embodiments of the present disclosure provide a clock synchronization solution, which can overcome the problem in the related art of incompatibility between the high-precision mode and the non-high-precision mode, and ensure that the chip can simultaneously support OC/BC/TC modes for the mixed clock nodes.

FIG. 1 is a flowchart of a clock synchronization method. As shown in FIG. 1, the method may include operations S1010 and S1020.

At S1010, in a case where a PTP message is received, attribute information of a PTP port is determined according to the PTP port of the received PTP message. The attribute information includes at least one of the following: clock node configuration type, high-precision mode or non-high-precision mode, non-high-precision ingress cf modification mark or non-high-precision egress cf modification mark, and asymmetric compensation value.

At S1020, clock synchronization is performed on the PTP message according to the attribute information of the PTP port.

Figure 6:
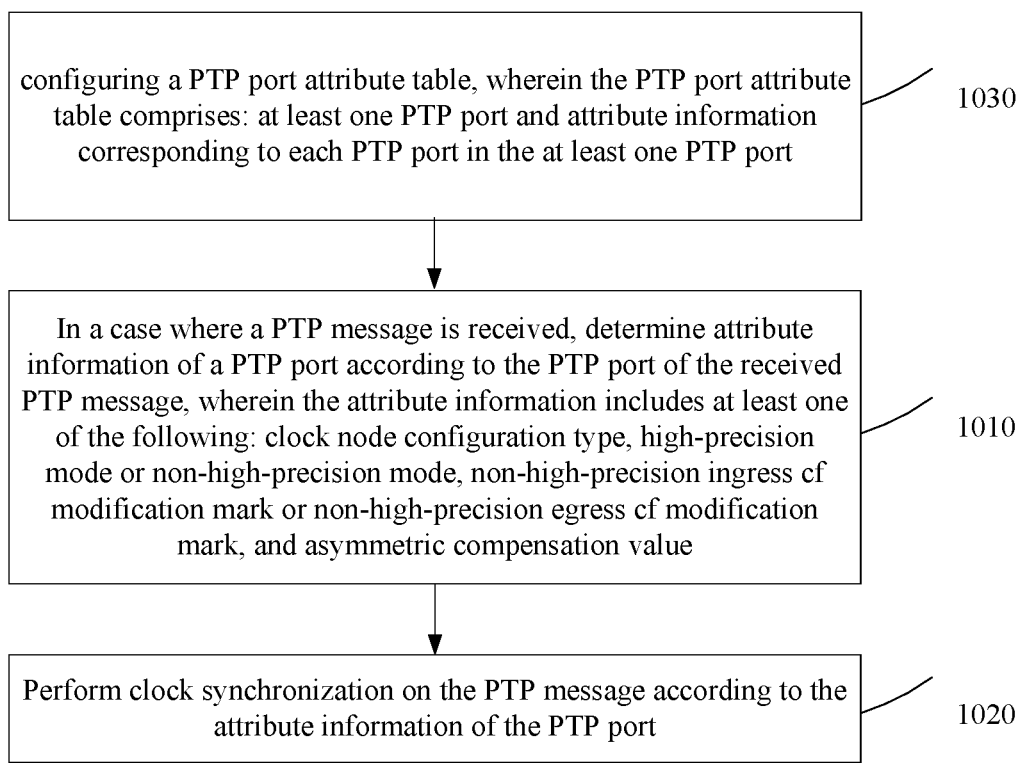
FIG. 6 is another flowchart of a clock synchronization method provided by the first example of the present disclosure.

In some implementations, as shown in FIG. 6, before the PTP message is received, the method may further include an operation of preconfiguring a PTP port attribute table. The PTP port attribute table includes at least one PTP port and attribute information corresponding to each PTP port in the at least one PTP port.

Figure 7:
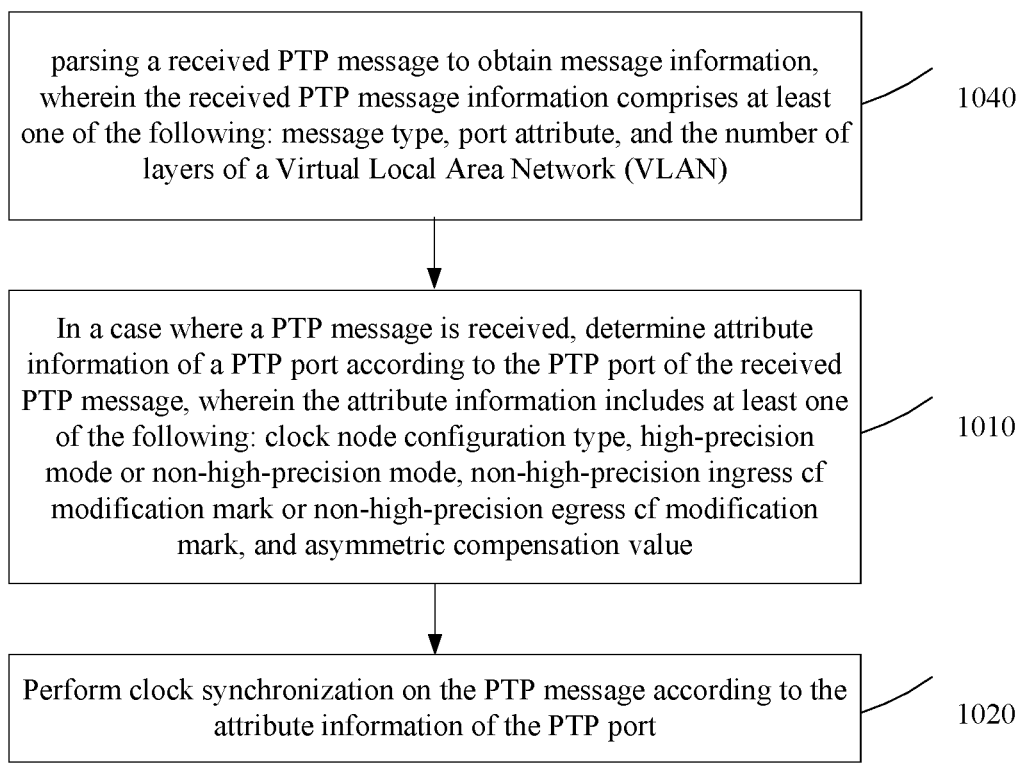
FIG. 7 is one more flowchart of a clock synchronization method provided by the first example of the present disclosure.

In some implementations, as shown in FIG. 7, the method may further include an operation of parsing a received message to obtain message information of the received message. The message information includes at least one of the following: message type, port attribute, and the number of layers of a Virtual Local Area Network (VLAN). The message type indicates that the message is of a PTP message type or of a message type except the PTP message type. The port attribute indicates that a port corresponding to the message is a layer 2 (L2) port or a layer 3 (L3) port. The number of layers of the VLAN indicates one of three modes of the VLAN.

In some implementations, in a case where the message type is the PTP message type, it is determined that the PTP message is received.

In some implementations, the operation that the attribute information of the PTP port is determined according to the obtained PTP port may be implemented in the following manner. An ingress PTP port of the PTP message is obtained according to the number of layers of the VLAN, and the attribute information of the ingress PTP port is determined according to a PTP port attribute table.

In some implementations, the operation that the attribute information of the PTP port is determined according to the obtained PTP port may be implemented in the following manner. An egress PTP port of the PTP message is obtained according to the port attribute, and the attribute information of the egress PTP port is determined according to the PTP port attribute table.

In some implementations, the method may further include that: in a case where the PTP message is received through a standard Ethernet port and the ingress PTP port is not able to be obtained, the PTP message is defaulted to be in the non-high-precision mode.

In some implementations, the operation that the clock synchronization is performed on the PTP message according to the attribute information of the PTP port may be implemented in the following manner. In a case where the ingress PTP port is in a high-precision mode, a sending time field of the PTP message is modified.

In some implementations, the operation that the clock synchronization is performed on the PTP message according to the attribute information of the PTP port may be implemented in the following manner. In a case where the egress PTP port is in the non-high-precision mode and the non-high-precision egress cf modification mark of the egress PTP port is enabled, the cf field of the PTP message is modified. In a case where the egress PTP port is in the non-high-precision mode and the non-high-precision egress cf modification mark of the egress PTP port is not enabled, the PTP message is not modified.

In some implementations, the operation that the cf field of the PTP message is modified may be implemented in the following manner. Residence time of the PTP message is calculated, and the cf field of the PTP message is modified according to the residence time.

In some implementations, the method may include an operation of modifying a User Datagram Protocol (UDP) check and checksum field of the PTP message.

Compared to the related art, the described technical solution may support both the high-precision mode and the non-high-precision mode for different interfaces, and is suitable for the actual complex scenarios in which the non-high-precision clock synchronization and the high-precision clock synchronization are intertwined.

The technical solution is described in detail below through the first example and the second example.

First Example

Figure 2:
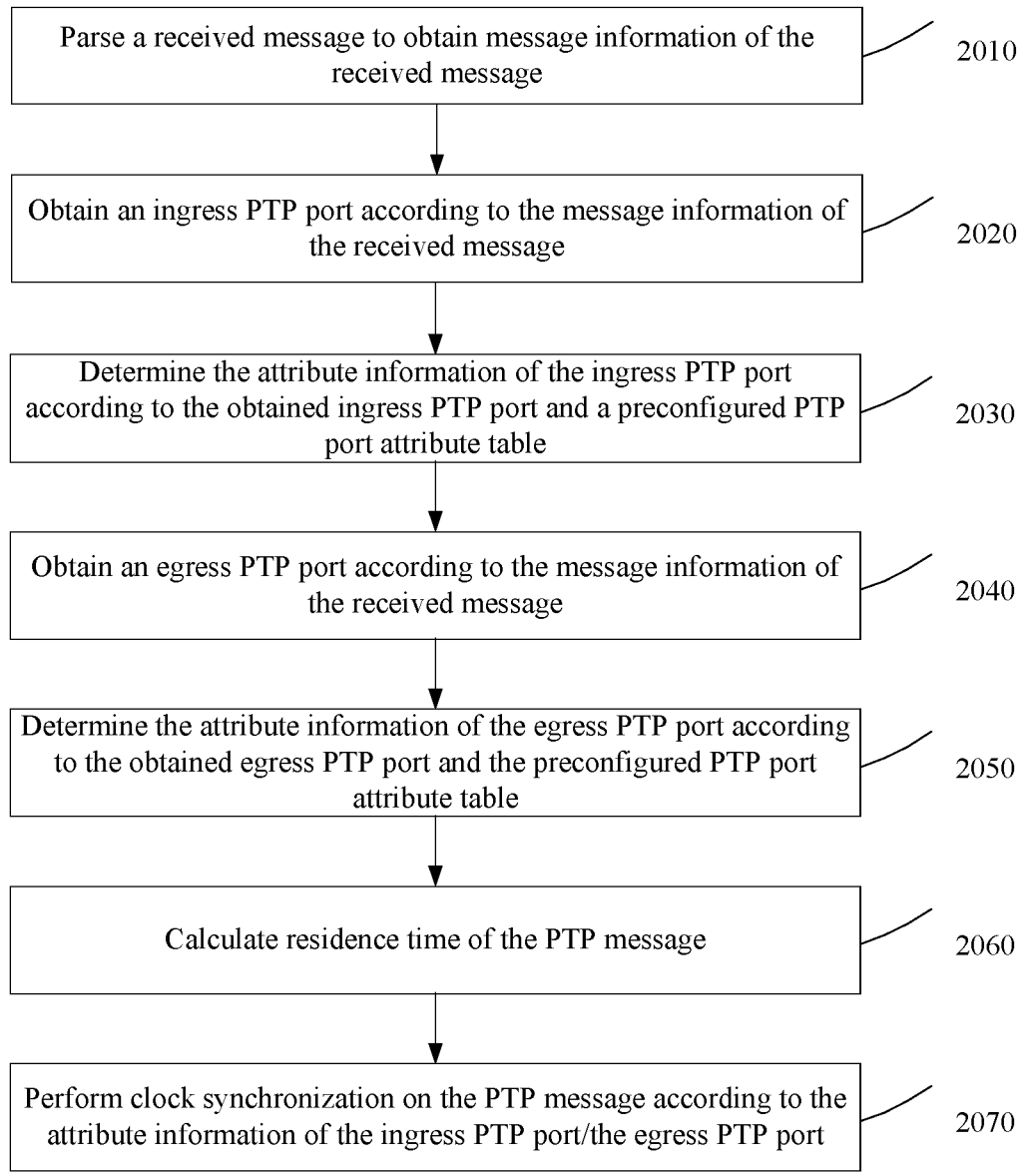
FIG. 2 is a flowchart of a clock synchronization method provided by the first example of the present disclosure.

FIG. 2 is a flowchart of a clock synchronization method provided by the first example of the present disclosure. As shown in FIG. 2, the method may include operations S2010 to S2070.

At S2010, a received message is parsed to obtain message information of the received message.

In the example, the message may be from a PTP engine or a standard Ethernet port. The message is parsed after being processed through an interface. Information of the message, such as a message type, a port attribute, and the number of layers of a VLAN, are mainly parsed from the message.

In the example, the message type indicates that the message is of the PTP message type or of the message type except the PTP message type, the port attribute indicates that a port corresponding to the message is the L2 port or the L3 port, and the number of layers of the VLAN indicates one of three modes of the VLAN.

In the example, in a case where the message type is the PTP message type, it is determined that the PTP message is received. The following operations are performed only in a case where a PTP message is received. If a non-PTP message is received, the message is processed according to the related art.

For the PTP message from the standard Ethernet port, operation S2020 is performed. For the PTP message from a side PTP engine, because the PTP message carries the egress PTP port, operation S2050 is performed directly.

At S2020, an ingress PTP port is obtained according to the message information of the received message.

In the example, for the PTP message from the standard Ethernet port, the ingress PTP port of the PTP message is obtained based on port/port+vlan/sip, and the PTP ports and physical ports may be in a many-to-one or one-to-many relationship.

At S2030, attribute information of the ingress PTP port is determined according to the obtained ingress PTP port and a preconfigured PTP port attribute table.

In the example, before the PTP message is received, a PTP port attribute table is preconfigured. The PTP port attribute table includes: at least one PTP port and attribute information corresponding to each PTP port in the at least one PTP port. The attribute information includes at least one of the following: a clock node configuration type, a high-precision mode or non-high-precision mode, a non-high-precision ingress cf modification mark or non-high-precision egress cf modification mark, and an asymmetric compensation value.

In addition, in a case where a PTP message is received through the standard Ethernet port and the ingress PTP port is not able to be obtained, the PTP message is defaulted to the non-high-precision mode.

In the example, for the PTP message from the standard Ethernet port, the ingress PTP port is obtained through port/port+vlan/sip, and the PTP port attribute table is looked up to determine the attribute information of the ingress PTP port. The attribute information includes a clock node configuration type, a high-precision mode or non-high-precision mode, and a non-high-precision ingress cf modification mark. For the PTP message from the standard Ethernet port, in a case where no ingress PTP port is obtained, the non-high-precision mode is obtained based on an ingress logical port of the PTP message.

In the example, the non-high-precision ingress cf modification mark in the attribute information of the PTP port may be compatible with a function of punching a time stamp at an ingress of a board card, thus improving the time precision, and effectively reducing the precision loss caused by the delay of the board card and the delay in the ingress direction of the chip. In addition, a port TC mode is supported, and TC mode configuration may be implemented flexibly based on the PTP port attribute table.

In a case where the message information of the received message also includes termination information and the ingress PTP port does not support the TC mode, operation S2070 is performed directly. In a case where the clock node of the ingress PTP port supports the TC mode, operation S2040 is performed.

At S2040, an egress PTP port is obtained according to the message information of the received message.

In the example, the egress PTP port of the PTP message is obtained according to the port attribute. In a case where the port attribute is the L2 port or the L3 port, the egress PTP port of the PTP message is obtained through L2/L3 forwarding.

At S2050, attribute information of the egress PTP port is determined according to the obtained egress PTP port and the preconfigured PTP port attribute table.

In the example, the attribute information of the egress PTP port is obtained based on the PTP port attribute table. The attribute information of the egress PTP port includes: a high-precision mode or non-high-precision mode, a non-high-precision egress cf modification mark, and an asymmetric compensation value.

In the example, the non-high-precision egress cf modification mark is compatible with a function of punching a time stamp at an egress of the board card, which effectively reduces the precision loss caused by the delay between the chip egress and the board card. Asymmetric compensation may effectively solve the precision loss caused by cross clock of chip, asynchronous First Input First Output (FIFO) and time-delay inconsistency of serial-parallel conversion links.

At S2060, residence time of the PTP message is calculated.

In the example, for the PTP message from the standard Ethernet port, because the non-high-precision ingress cf modification mark is compatible with a function of punching a time stamp at an ingress of a board card, and the non-high-precision egress cf modification mark is compatible with a function of punching a time stamp at the egress of the board card, in the non-high-precision mode, the PTP residence time is calculated by subtracting ingress PTP time from the egress PTP time, and adding the configured compensation value. In this way, the residence time of the PTP message inside the chip is obtained. For the PTP message from the side PTP engine, the non-high-precision egress cf modification mark is compatible with the function of punching a time stamp at the egress of the board card, in the non-high-precision mode, the PTP residence time is calculated by subtracting ingress time information carried in the message from the egress PTP time, and adding the configured compensation value. In this way, the residence time of the PTP message inside the chip is obtained.

At S2070, clock synchronization is performed on the PTP message according to the attribute information of the ingress PTP port/the egress PTP port.

In the example, because the TC mode does not support the high-precision mode, in a case where the clock node configuration type of the ingress PTP port is type OC or BC, and is in the high-precision mode, the sending time field of the PTP message is modified according to an external clock source.

In the example, in a case where the clock node configuration type of the egress PTP port is type OC or BC or TC, and is in the non-high-precision mode, if the non-high-precision egress cf modification mark of the egress PTP port has been enabled, the cf field of the PTP message is modified according to the residence time of the PTP message; and if the non-high-precision egress cf modification mark of the egress PTP port is not enabled, the PTP message is not modified.

In the example, in a case where no modification mode is configured (both the ingress and the egress are not configured with the non-high-precision cf modification mark), the PTP message is not modified.

In addition, for the L3 PTP message, it is needed to modify the UDP check and checksum field. The udp_checksum modification includes a variety of calculation modes, which may support recalculation, resetting and no modification modes.

Second Example

Figure 3:
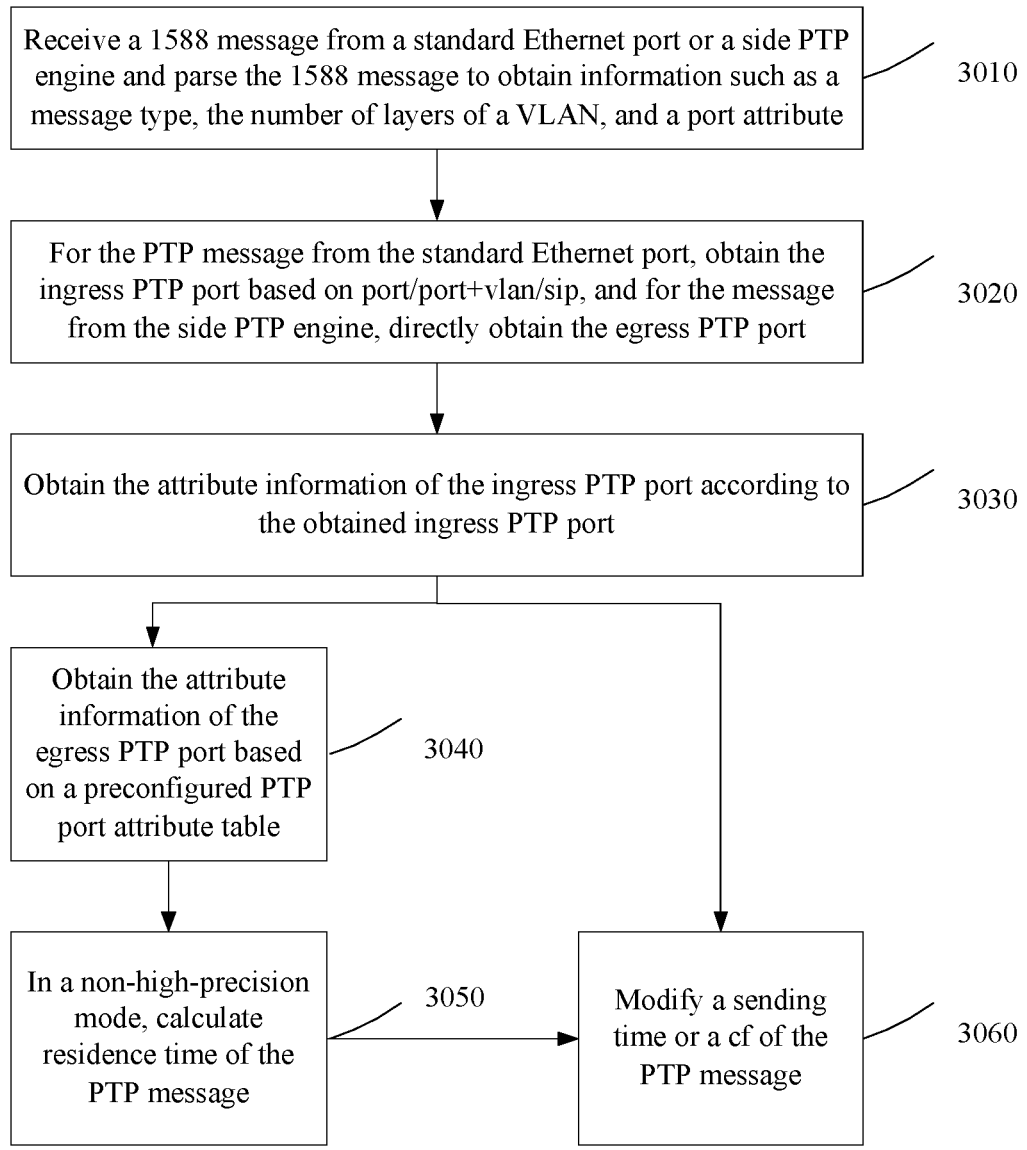
FIG. 3 is a flowchart of a clock synchronization method provided by the second example of the present disclosure.

FIG. 3 is a flowchart of a clock synchronization method provided by the second example of the present disclosure. As shown in FIG. 3, the method may include operations S3010 to S3060.

At S3010, a 1588 message from a standard Ethernet port or z side PTP engine is received and parsed to obtain information such as a message type, the number of layers of a VLAN, and a port attribute.

At S3020, for the PTP message from the standard Ethernet port, an ingress PTP port is obtained based on port/port+vlan/sip, and for the PTP message from the side PTP engine, an egress PTP port is obtained directly.

In the example, the PTP ports and the physical ports may be in a many-to-one or one-to-many relationship.

At S3030, attribute information of the ingress PTP port is obtained according to the obtained ingress PTP port.

In the example, the attribute information of the PTP port may be obtained through a preconfigured PTP port attribute table. The attribute information includes: a clock node configuration type, a high-precision mode, and a non-high-precision ingress cf modification mark.

In the example, the clock node mode is the configuration type of the clock node, including the OC/BC/TC mode.

In the example, the non-high-precision ingress cf modification mark may be compatible with the function of punching a time stamp at an ingress of a board card, thus improving the time precision, and effectively reducing the precision loss caused by the delay of the board card and the delay in the ingress direction of the chip. In addition, the port TC mode is supported, and the TC mode configuration may be implemented flexibly based on the PTP attribute table or the port attribute table.

Because the TC mode does not support the high-precision mode, the high-precision mode of the OC/BC mode will terminate at a node without determining the egress PTP port. That is, only in a case where the ingress PTP port supports the TC mode or the PTP message is sent from the side PTP engine (the sending side is in the OC/BC mode), operation S3040 is performed; and in a case where the ingress PTP port does not support the TC mode and the PTP message is not sent from the side PTP engine, operation S3060 is performed directly.

At S3040, attribute information of the egress PTP port is obtained based on the preconfigured PTP port attribute table.

In the example, the attribute information of the egress PTP port includes a high-precision mode, a non-high-precision egress cf modification mark, and an asymmetric compensation value.

In the example, the non-high-precision egress cf modification mark may be compatible with the function of punching a time stamp at the egress of the board card, which effectively reduces the precision loss caused by the delay between the chip egress and the board card. The asymmetric compensation may effectively solve the precision loss caused by the cross clock of chip, the asynchronous FIFO and the time-delay inconsistency of serial-parallel conversion links.

At S3050, in the non-high-precision mode, residence time of the PTP message is calculated.

In the example, for the PTP message from the standard Ethernet port, the residence time is calculated by subtracting the ingress PTP time from the egress PTP time, and adding the configured compensation value. In this way, the residence time of the PTP message inside the chip is obtained. For the PTP message from the side PTP engine, the residence time is calculated by subtracting the ingress time information carried in the message from the egress PTP time, and adding the configured compensation value. In this way, the residence time of the PTP message inside the chip is obtained.

At S3060, a sending time or the cf of the PTP message is modified.

In the example, modifying the sending time refers to modifying the sending time of the message in the high-precision mode, and modifying the cf refers to correcting a PTP message forwarding delay in a non-high-precision mode.

In addition, it is needed to modify an udp_checksum field corresponding to the PTP message. Modifying the udp_checksum field includes a variety of calculation modes, which may support recalculation, resetting and no modification modes.

In the technical solution provided in the first example and the second example of the present disclosure, the high-precision mode or the non-high-precision mode is selected based on the attribute information of the PTP port, that is, the clock synchronization of the PTP message is realized by modifying the sending time or cf of the PTP message. In addition, the technical solution is compatible with the function of punching a time stamp on the board card for the non-high-precision mode.

Figure 4:
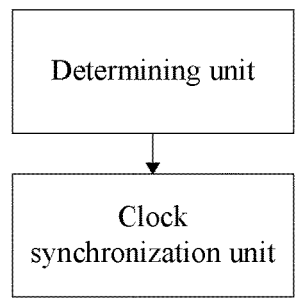
FIG. 4 is a structure diagram of a clock synchronization system.

FIG. 4 is a structure diagram of a clock synchronization system. As shown in FIG. 4, the system may include: a determining unit and a clock synchronization unit. The determining unit is configured to determine, in a case where a PTP message is received, attribute information of a PTP port according to the PTP port of the received PTP message. The attribute information includes at least one of the following: a clock node configuration type, a high-precision mode or non-high-precision mode, a non-high-precision ingress cf modification mark or non-high-precision egress cf modification mark, and an asymmetric compensation value. The clock synchronization unit is configured to perform clock synchronization on the PTP message according to the attribute information of the PTP port.

In some implementations, the non-high-precision ingress cf modification mark is compatible with the function of punching a time stamp at the ingress of the board card; and/or, the non-high-precision egress cf modification mark is compatible with the function of punching a time stamp at the egress of the board card.

In some implementations, the system may further include a configuring unit, which is configured to preconfigure a PTP port attribute table before the PTP message is received. The PTP port attribute table includes: at least one PTP port and attribute information corresponding to each PTP port in the at least one PTP port.

In some implementations, the determining unit may include: a message parsing module, configured to parse a received message to obtain the message information of the received message. The message information includes at least one of the following: a message type, a port attribute, and the number of layers of a VLAN. The message type indicates that the message is of a PTP message type or of a message type except the PTP message type. The port attribute indicates that a port corresponding to the message is the L2 port or the L3 port. The number of layers of the VLAN indicates one of three modes of the VLAN.

In some implementations, the determining unit may further include: a determining module, which is configured to determine, in a case where the message type is the PTP message type, that the PTP message is received.

In some implementations, the determining unit may further include: an ingress PTP processing module, which is configured to obtain an ingress PTP port of the PTP message according to the number of layers of the VLAN, and determine the attribute information of the ingress PTP port according to a PTP port attribute table.

In some implementations, the determining unit may further include: a L2/L3 forwarding module and an egress PTP processing module. The L2/L3 forwarding module is configured to obtain an egress PTP port of the PTP message according to the port attribute. The egress PTP processing module is configured to determine the attribute information of the egress PTP port according to the PTP port attribute table.

In some implementations, the ingress PTP processing module is further configured to default, in a case where a PTP message is received through a standard Ethernet port and the PTP port is not able to be obtained, the PTP message to the non-high-precision mode.

In some implementations, the clock synchronization unit is configured to: in a case where the clock node configuration type of the ingress PTP port is type OC or BC, and is in the high-precision mode, modify a sending time field of the PTP message; in a case where the clock node configuration type of the egress PTP port is type OC or BC or TC and is in the non-high-precision mode, and the non-high-precision egress cf modification mark of the egress PTP port has been enabled, modify the cf field of the PTP message; and in a case where the egress PTP port is in the non-high-precision mode and the non-high-precision egress cf modification mark of the egress PTP port is not enabled, not modify the PTP message.

In some implementations, the clock synchronization unit may include: a residence time calculating module and a PTP message modifying module. The residence time calculating module is configured to calculate residence time of the PTP message. The PTP message modifying module is configured to modify a cf field of the PTP message according to the residence time.

In some implementations, the PTP message modifying module is further configured to modify an UDP check and checksum field of the PTP message.

The technical solution is described below through a third example.

Third Example

Figure 5:
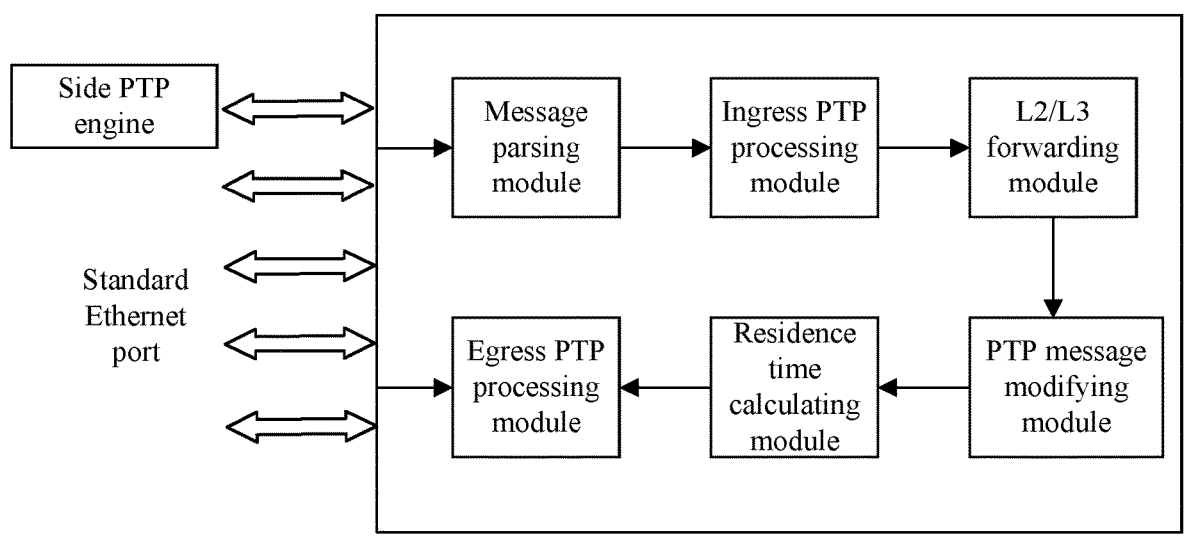
FIG. 5 is a flowchart of a clock synchronization method provided by the third example of the present disclosure.

FIG. 5 is a flowchart of a clock synchronization method provided by the third example of the present disclosure. As shown in FIG. 5, the method may include operations S5010 to S5060.

At S5010, a PTP message from a side PTP engine or a standard Ethernet port is received and sent to a message parsing module after being processed through an interface. The message parsing module mainly parses information such as a message type, a port attribute, the number of layers of a VLAN.

At S5020, at an ingress PTP processing module, for the PTP message from the standard Ethernet port, an ingress PTP port is obtained through port/port+vlan/sip, and a PTP port attribute table is looked up to obtain a clock node configuration type, a high-precision mode and a non-high-precision ingress cf modification mark of the ingress PTP port. In a case where no ingress PTP port is obtained, the non-high-precision mode is obtained based on the ingress logical port of the PTP message.

In the example, the PTP port can be directly determined for the PTP message from the side PTP engine, so operation S5040 may be performed directly.

At S5030, an egress PTP port of the PTP message is obtained through a L2/L3 forwarding module.

At S5040, in an egress PTP processing module, attribute information of the egress PTP port, such as a high-precision mode, a non-high-precision egress cf modification mark, and an asymmetric compensation value, are obtained based on the PTP port attribute table.

At S5050, in a residence time calculating module, residence time of the PTP message is calculated. In a case where the board card corresponding to the ingress enables cf modification, an ingress time stamp is not considered in the residence time calculating module; and in a case where the board card corresponding to the egress enables cf modification, an egress time stamp is not considered in the residence time calculating module.

At S5060, in a PTP message modifying module, in a case where the ingress PTP port is in the high-precision mode, a sending time field of the PTP message is modified; in a case where the egress PTP port is in the non-high-precision mode, if the non-high-precision egress cf modification mark of the egress PTP port is enabled, the cf field of the PTP message is modified; and in a case where there is no modification mode configured (both the ingress and the egress are not configured with the non-high-precision egress cf modification mark), the PTP message is not modified.

In addition, for the L3 PTP message, it is needed to modify an udp_checksum field.

In the technical solution provided in the third example of the present disclosure, based on the attribute information of the PTP port which is obtained by the ingress/egress PTP processing module, the PTP message modifying module selects to use the high-precision mode or the non-high-precision mode, i.e., to modify the sending time or the cf of the message, to achieve the clock synchronization. Therefore, both the high-precision mode and the non-high-precision mode may be supported for different interfaces, which is suitable for the actual complex application scenarios in which the non-high-precision clock synchronization and the high-precision clock synchronization are intertwined, and is compatible with the function of punching a time stamp on the board card for the non-high-precision mode.

The embodiments of the present disclosure also provide a clock synchronization device, which may include a memory, a processor and a computer program which is stored on the memory and capable of running on the processor. When executed by the processor, the computer program implements the clock synchronization method.

The embodiments of the present disclosure also provide a computer-readable storage medium, which stores an information processing program. When executed by the processor, the information processing program implements any above clock synchronization method.

All or some of the operations in the above method, system, and functional modules/units in the device may be implemented as software, firmware, hardware and a proper combination of software, firmware and hardware. In hardware embodiments, the division between functional modules/units mentioned in the above description does not necessarily correspond to the division of physical components. For example, a physical component may have multiple functions, or a function or operation may be performed collaboratively by multiple physical components. Some or all of the components may be implemented as software performed by a processor (for example, a digital signal processor or a microprocessor), or implemented as hardware, or implemented as an integrated circuit (for example, an application-specific integrated circuit). Such software may be distributed on computer readable media. The computer readable media may include computer storage media (or non-temporary media) and communication media (or temporary media). The term computer storage media include volatile and non-volatile media, and removable and un-removable media which are implemented in any method or technology for storing information (such as a computer readable instruction, a data structure, a program module or other data). The computer storage media include, but not limited to, a Random Access Memory (RAM), a Read-Only Memory (ROM), an EEPROM, an Electrically Erasable Programmable Read-Only Memory (EEPROM), a flash memory or other memory technologies, a Compact Disc Read-Only Memory (CD-ROM), a Digital Video Disk (DVD) or other optical storage, a cartridge, a tape, a disk storage or other magnetic storage devices, or any other media which may be used for storing expected information and may be accessed by a computer. Moreover, the communication media generally include the computer readable instruction, the data structure, the program module or other data, such as carriers or other transmission mechanisms, in a modulation data signal, and may include any information delivery media.

What is claimed is:

1. A clock synchronization method performed by a clock synchronization system, the method comprising:
   in a case where a Precision Time Protocol (PTP) message from message sending end is received, determining attribute information of a PTP port of the received PTP message, wherein the attribute information comprises at least one of the following: high-precision mode or non-high-precision mode, non-high-precision ingress correction field (cf) modification mark or non-high-precision egress cf modification mark; and
   performing clock synchronization on the PTP message according to the attribute information of the PTP port;
   wherein performing the clock synchronization on the PTP message according to the attribute information of the PTP port comprises:
   in a case where an ingress PTP port is in a high-precision mode, modifying a sending time field of the PTP message to perform clock synchronization on the PTP message;
   wherein performing the clock synchronization on the PTP message according to the attribute information of the PTP port comprises:
   in a case where an egress PTP port is in the non-high-precision mode and the non-high-precision egress cf modification mark of the egress PTP port is enabled, modifying a cf field of the PTP message to perform clock synchronization on the PTP message; and
   in a case where the egress PTP port is in the non-high-precision mode and the non-high-precision egress cf modification mark of the egress PTP port is not enabled, not modifying the PTP message to perform clock synchronization on the PTP message.

2. The method according to claim 1, before determining attribute information of a PTP port of the received PTP message, the method further comprising:
   configuring a PTP port attribute table, wherein the PTP port attribute table comprises: at least one PTP port and attribute information corresponding to each PTP port in the at least one PTP port.

3. The method according to claim 1, further comprising:
   parsing a received PTP message to obtain message information, wherein the received PTP message information comprises at least one of the following: message type, port attribute, and the number of layers of a Virtual Local Area Network (VLAN);
   wherein the message type indicates that the message is of a PTP message type or of a message type except the PTP message type, the port attribute indicates that a port corresponding to the message is a layer 2 (L2) port or a layer 3 (L3) port, and a number of layers of the VLAN indicates one of three modes of the VLAN.

4. The method according to claim 3, after parsing the received PTP message to obtain the message information, further comprising:
   in a case where the message type is the PTP message type, determining that the PTP message is received.

5. The method according to claim 3, wherein determining the attribute information of the PTP port of the received PTP message comprises at least one of the following:
   obtaining an ingress PTP port of the PTP message according to the number of layers of the VLAN, and determining the attribute information of the ingress PTP port according to a PTP port attribute table; and obtaining an egress PTP port of the PTP message according to the port attribute, and determining the attribute information of the egress PTP port according to the PTP port attribute table.

6. The method according to claim 5, further comprising: in a case where the PTP message is received through a standard Ethernet port and the ingress PTP port is not able to be obtained, the PTP message is defaulted to be in the non-high-precision mode.

7. The method according to claim 5, wherein determining the attribute information of the PTP port of the received PTP message comprises at least one of the following:
in a case where the PTP message is received through from a standard Ethernet port, obtaining the ingress PTP port of the PTP message according to the number of layers of the VLAN, and determining the attribute information of the ingress PTP port according to the PTP port attribute table; and obtaining the egress PTP port of the PTP message according to the port attribute, and determining the attribute information of the egress PTP port according to the PTP port attribute table;
in a case where the PTP message is received through from a side PTP engine, obtaining the egress PTP port of the PTP message from the PTP message, and determining the attribute information of the egress PTP port according to the PTP port attribute table.

8. The method according to claim 7, wherein in a case where the PTP message is received through from the standard Ethernet port, obtaining the ingress PTP port of the PTP message according to the number of layers of the VLAN, and determining the attribute information of the ingress PTP port according to the PTP port attribute table comprises:
in a case where the PTP message is received through from the standard Ethernet port, obtaining the ingress PTP port of the PTP message based on port/port+vlan/sip, and determining the attribute information of the ingress PTP port according to the obtained ingress PTP port and the PTP port attribute table.

9. The method according to claim 5, wherein obtaining the egress PTP port of the PTP message according to the port attribute comprises:
in a case where the port attribute is the L2 port or the L3 port, obtaining the egress PTP port of the PTP message through L2/L3 forwarding.

10. The method according to claim 1, wherein modifying the cf field of the PTP message comprises:
calculating residence time of the PTP message, and modifying the cf field of the PTP message according to the residence time.

11. The method according to claim 10, wherein calculating the residence time of the PTP message comprises:
in a case where the PTP message is received through from a standard Ethernet port, calculating the residence time of the PTP message by subtracting an ingress PTP time from an egress PTP time, and adding a configured compensation value.

12. The method according to claim 10, wherein calculating the residence time of the PTP message comprises:
in a case where the PTP message is received through from a side PTP engine, calculating the residence time of the PTP message by subtracting an ingress time information carried in the PTP message from an egress PTP time, and adding a configured compensation value.

13. The method according to claim 1, further comprising: modifying a User Datagram Protocol (UDP) check and checksum field of the PTP message.

14. A clock synchronization device, comprising: a memory, a processor and a computer program which is stored on the memory and capable of running on the processor, wherein when executed by the processor, the computer program implements the clock synchronization method according to claim 1.

15. The method according to claim 1, wherein
the non-high-precision ingress cf modification mark is compatible with a function of punching a time stamp at an ingress of a board card; and
the non-high-precision egress cf modification mark is compatible with a function of punching a time stamp at an egress of the board card.

16. A clock synchronization system, comprising a memory storing instructions and a processor in communication with the memory, wherein the processor is configured to execute the instructions to:
determine, in a case where a Precision Time Protocol (PTP) message from message sending end is received, attribute information of a PTP port of the received PTP message, wherein the attribute information comprises at least one of the following: high-precision mode or non-high-precision mode, non-high-precision ingress correction field (cf) modification mark or non-high-precision egress cf modification mark; and
perform clock synchronization on the PTP message according to the attribute information of the PTP port;
the processor is further configured to in a case where an ingress PTP port is in a high-precision mode, modify a sending time field of the PTP message to perform clock synchronization on the PTP message; in a case where an egress PTP port is in the non-high-precision mode and the non-high-precision egress cf modification mark of the egress PTP port is enabled, modify a cf field of the PTP message to perform clock synchronization on the PTP message; and in a case where the egress PTP port is in the non-high-precision mode and the non-high-precision egress cf modification mark of the egress PTP port is not enabled, not modify the PTP message to perform clock synchronization on the PTP message.

17. The system according to claim 16, wherein
the non-high-precision ingress cf modification mark is compatible with a function of punching a time stamp at an ingress of a board card; and
the non-high-precision egress cf modification mark is compatible with a function of punching a time stamp at an egress of the board card.

18. A non-transitory computer-readable storage medium, storing an information processing program, wherein when executed by a processor, the information processing program causes the processor to:
determine, in a case where a Precision Time Protocol (PTP) message from message sending end is received, attribute information of a PTP port of the received PTP message, wherein the attribute information comprises at least one of the following: high-precision mode or non-high-precision mode, non-high-precision ingress correction field (cf) modification mark or non-high-precision egress cf modification mark; and
perform clock synchronization on the PTP message according to the attribute information of the PTP port, wherein the information processing program causes the processor to perform the clock synchronization on the PTP message by causing the processor to:

in a case where an ingress PTP port is in a high-precision mode, modify a sending time field of the PTP message to perform clock synchronization on the PTP message;

in a case where an egress PTP port is in the non-high-precision mode and the non-high-precision egress cf modification mark of the egress PTP port is enabled, modify a cf field of the PTP message to perform clock synchronization on the PTP message; and in a case where the egress PTP port is in the non-high-precision mode and the non-high-precision egress cf modification mark of the egress PTP port is not enabled, not modify the PTP message to perform clock synchronization on the PTP message.

\* \* \* \* \*